(12) United States Patent
Xiang

(10) Patent No.: US 12,360,658 B2
(45) Date of Patent: Jul. 15, 2025

(54) PICTURE SAVING METHOD, ELECTRONIC DEVICE AND STORAGE MEDIUM

(71) Applicant: GREE ELECTRIC APPLIANCES, INC. OF ZHUHAI, Zhuhai (CN)

(72) Inventor: Guangyong Xiang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 18/257,159

(22) PCT Filed: Nov. 8, 2021

(86) PCT No.: PCT/CN2021/129303
§ 371 (c)(1),
(2) Date: Jun. 13, 2023

(87) PCT Pub. No.: WO2022/156312
PCT Pub. Date: Jul. 28, 2022

(65) Prior Publication Data
US 2024/0103710 A1   Mar. 28, 2024

(30) Foreign Application Priority Data

Jan. 22, 2021   (CN) .......................... 202110085555.0

(51) Int. Cl.
*G06F 3/00*   (2006.01)
*G06F 3/04817*   (2022.01)
(Continued)

(52) U.S. Cl.
CPC ........ *G06F 3/0486* (2013.01); *G06F 3/04817* (2013.01); *G06F 3/04845* (2013.01)

(58) Field of Classification Search
CPC . G06F 3/04817; G06F 3/04845; G06F 3/0486
See application file for complete search history.

(56) References Cited

U.S. PATENT DOCUMENTS 6,097,389 A    8/2000 Morris et al.
9,832,368 B1   11/2017 Agrawal et al.
(Continued)

FOREIGN PATENT DOCUMENTS

CN    105160017 A    12/2015
CN    106814954 A    6/2017
(Continued)

OTHER PUBLICATIONS

International Search Report issued in corresponding International App. No. PCT/CN2021/129303, with Engilsh translation, mailed Jan. 30, 2022, 4 pages.
(Continued)

*Primary Examiner* — Jessica S Manno
*Assistant Examiner* — Andrew Chung
(74) *Attorney, Agent, or Firm* — Armstrong Teasdale LLP

(57) ABSTRACT

Disclosed are a picture saving method, an electronic device and a storage medium. The method includes the following steps: in an acquisition step, in response to a picture saving instruction of a user, acquiring pictures to be saved to a preset icon; in a first display step, displaying the preset icon on a screen; in a second display step, in response to a first instruction of the user operating the preset icon, triggering display of an album window; and in a saving step, in response to a second instruction of the user operating the preset icon, saving at least one of the pictures to be saved to a designated album displayed in the album window.

10 Claims, 10 Drawing Sheets

(51) Int. Cl.
*G06F 3/04845* (2022.01)
*G06F 3/0486* (2013.01)

(56) References Cited

U.S. PATENT DOCUMENTS

| | | | | |
|---|---|---|---|---|
| 10,444,963 B2* | 10/2019 | Bereza | ............... | G06F 3/0412 |
| 2005/0289476 A1* | 12/2005 | Tokkonen | ............ | G06F 3/0486 |
| | | | | 715/769 |
| 2009/0313567 A1* | 12/2009 | Kwon | ............... | G06F 3/0482 |
| | | | | 715/830 |
| 2013/0111400 A1* | 5/2013 | Miwa | ............... | G06F 3/0488 |
| | | | | 715/835 |
| 2014/0118258 A1* | 5/2014 | Park | ............... | G06F 1/1643 |
| | | | | 345/158 |
| 2015/0350403 A1* | 12/2015 | Eim | ............... | H04W 4/20 |
| | | | | 455/420 |
| 2018/0335937 A1* | 11/2018 | Hauenstein | ......... | G06F 3/04883 |

FOREIGN PATENT DOCUMENTS

| | | |
|---|---|---|
| CN | 107862007 A | 3/2018 |
| CN | 109164969 A | 1/2019 |
| CN | 110175252 A | 8/2019 |
| CN | 112732142 A | 4/2021 |
| EP | 3674868 A1 | 7/2020 |
| EP | 3916532 A1 | 12/2021 |
| WO | 2020151512 A1 | 7/2020 |

OTHER PUBLICATIONS

Extended European Search Report in European Application No. 21920688.5, mailed Apr. 8, 2024, 7 pgs.
First Examination Report in Chinese Application No. 2021100855550, dated Jul. 1, 2021, appended with English Translation.
Second Examination Report in Chinese Application No. 2021100855550, dated Dec. 10, 2021, No English Translation Available.

* cited by examiner

Moving to touch the edge of the screen

PICTURE SAVING METHOD, ELECTRONIC DEVICE AND STORAGE MEDIUM

CROSS-REFERENCE TO RELATED APPLICATION

The present application is a National Stage Entry of International Application No. PCT/CN2021/129303, filed Nov. 8, 2021, entitled "Picture Saving Method, Electronic Device and Storage Medium," which claims priority to Chinese Patent Application No. 202110085555.0 filed to the China National Intellectual Property Administration on Jan. 22, 2021, and entitled "Picture Saving Method, Electronic Device and Storage Medium," which are herein incorporated by reference in their entirety.

TECHNICAL FIELD

The present disclosure relates to the field of internet technologies, in particular to a picture saving method, an electronic device and a storage medium.

BACKGROUND

With the continuous progress of the present age, electronic devices such as mobile phones and tablet computers already become the electronic devices commonly used by people, and viewing pictures in the electronic devices is also one of functions commonly used by people.

Existing modes for saving the pictures are achieved, for example, by long-pressing the bottom of a picture to pop up a new window, and then clicking a download button. The drawback of this method is that: firstly, the saving process requires a two-step operation, which is too cumbersome. Secondly, this saving mode may briefly display a text floating window at the end of saving, and the picture saving location may not be selected, a default group may be formed, and the saved pictures may also not be browsed in real time, and may only be viewed in a mobile phone picture library. At the same time, the existing picture saving methods may not save the pictures in batches from different software to a certain group, and the different software needs to be opened separately for operations.

Therefore, it is necessary to conduct research and development in response to the problems existing in the above related technologies, as to provide a picture saving method that may preview groupings conveniently and achieve batch-saving.

SUMMARY

A main purpose of the present disclosure is to provide a picture saving method, an electronic device and a storage medium.

In a first aspect, the present disclosure provides a picture saving method, and the picture saving method includes the following steps:
in an acquisition step, in response to a picture saving instruction of a user, pictures to be saved are acquired to a preset icon;
in a first display step, the preset icon is displayed on a screen;
in a second display step, in response to a first instruction of the user operating the preset icon, display of an album window is triggered;
in a saving step, in response to a second instruction of the user operating the preset icon, at least one of the pictures to be saved is saved to a designated album displayed in the album window.

In some implementation modes, the above picture saving method further includes: the second instruction includes an instruction for the user to long-press the preset icon and an instruction for the user to drag the preset icon to the designated album.

The saving step includes the following steps:
in response to the instruction for the user to long-press the preset icon, the preset icon is enabled to be in a draggable state;
in response to the instruction for the user to drag the preset icon to the designated album, all the pictures to be saved are saved to the designated album.

In some implementation modes, the above picture saving method further includes: the second instruction includes an instruction for the user to single click the preset icon, an instruction for the user to long-press the a designated picture and an instruction for the user to drag the designated picture.

The saving step includes the following steps:
in response to the instruction for the user to single click the preset icon, the preset icon is expanded into a floating window, and all the pictures to be saved are displayed in the floating window;
in response to the instruction for the user to long-press the designated picture, the designated picture is enabled to be in the draggable state;
in response to the instruction for the user to drag the designated picture, the designated picture is saved to the designated album corresponding to the designated picture.

In some implementation modes, the above picture saving method further includes the following steps: thumbnails of all the pictures to be saved are displayed in the floating window.

In some implementation modes, the above picture saving method further includes: the saving step further includes the following step.

In response to an instruction for the user to edit a picture, the pictures to be saved are edited.

In some implementation modes, the above picture saving method further includes: the first display step further includes the following step: the number of the pictures to be saved is displayed on the preset icon.

In some implementation modes, the above picture saving method further includes the following step: in a moving step, in response to an instruction for the user to long-press the preset icon, the preset icon is enabled to be in a draggable state, and in response to an instruction for the user to drag the preset icon, the preset icon is moved.

In some implementation modes, the above picture saving method further includes: the first instruction is that the preset icon is moved to the edge of the screen.

In a second aspect, the present disclosure provides an electronic device, including a memory and a processor, herein the memory is configured to store one or more computer instructions, herein the picture saving method described in any one of items in the first aspect is achieved while the one or more computer instructions are executed by the processor.

In a third aspect, the present disclosure provides a computer-readable storage medium, in which a program is stored, herein the picture saving method described in any one of the items in the first aspect is achieved while the program is executed by a computer.

Compared with the related technologies, one or more embodiments in the above schemes may have the following advantages or beneficial effects.

By saving the pictures to be saved to the preset icon, and saving the pictures to be saved to the designated album by the preset icon, the present disclosure allows the user to view the number of the pictures and browse the contents of the saved pictures in real time while the pictures are saved, and quickly save the pictures to the custom album group.

BRIEF DESCRIPTION OF THE DRAWINGS

Drawings of the description for constituting a part of the present disclosure are used to provide further understanding of the present disclosure. Schematic embodiments of the present disclosure and descriptions thereof are used to explain the present disclosure, and do not constitute improper limitation to the present disclosure. In the drawings.

DETAILED DESCRIPTION OF THE EMBODIMENTS

Implementation modes of the present disclosure are described in detail below in combination with drawings and embodiments, in order to fully understand and implement the implementation process of how to apply technical means to solve technical problems and achieve corresponding technical effects in the present disclosure. The embodiments of the present disclosure and respective features in the embodiments may be combined with each other without conflicting, and technical schemes formed are all within a scope of protection of the present disclosure.

Figure 1:
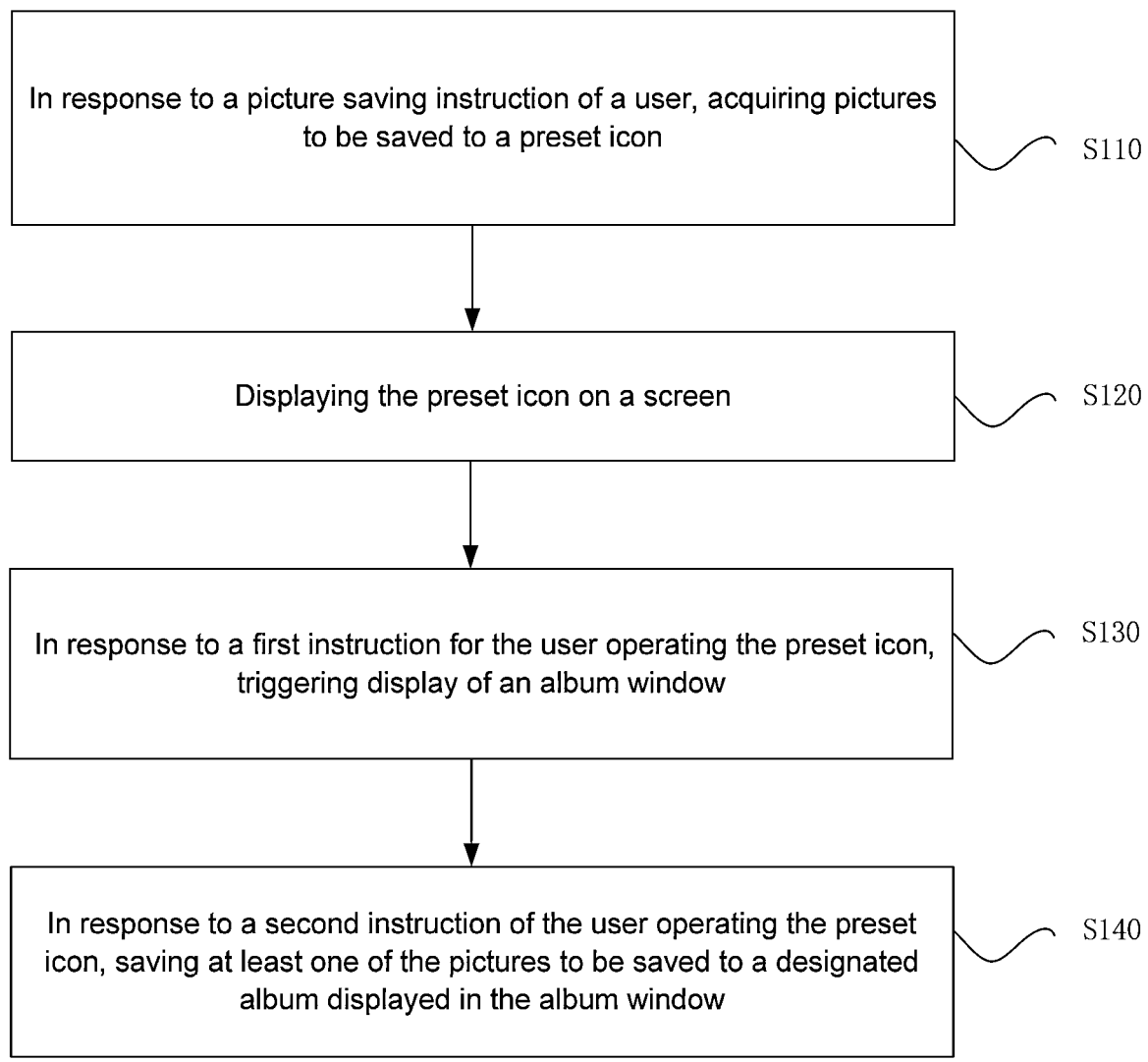
FIG. 1 is a flowchart of a picture saving method according to an exemplary implementation mode of the present disclosure.

As shown in FIG. 1, an implementation mode of the present disclosure provides a picture saving method, and the picture saving method includes the following steps S110 to S140.

In the step S110, in response to a picture saving instruction of a user, pictures to be saved are acquired to a preset icon.

For example, while a picture is browsed in mobile phone application software, a picture saving button is clicked. Thus, in response to the picture saving instruction of the user, picture information to be saved is saved to one preset icon for subsequent processing.

In the step S120, the preset icon is displayed on a screen.

For example, after the user clicks the picture saving button, the preset icon is displayed on the mobile phone screen for subsequent operations.

In the step S130, in response to a first instruction for the user operating the preset icon, display of an album window is triggered.

For example, firstly, the user long-presses the preset icon so that it is in the draggable state, then drags the preset icon to the edge of the screen in response to the operation instruction for the user to drag the preset icon to the edge of the screen, and display of an album window is triggered. Specifically, while the preset icon is in the draggable state, the preset icon is displayed as a jitter state.

In the step S140, in response to a second instruction of the user operating the preset icon, at least one of the pictures to be saved is saved to a designated album displayed in the album window.

For example, the user drags the preset icon to the designated album, in response to the operation instruction for the user to drag the preset icon, all the pictures to be saved in the preset icon are saved to the designated album. Alternatively, it is set to click the preset icon to display thumbnails of the pictures to be saved, the thumbnail of the designated picture is dragged to the designated album, in response to the operation instruction for the user to drag the designated picture, and the designated picture is saved to the designated album. The above two situations may be elaborated in detail in the following text with reference to FIG. 2 and FIG. 3, respectively.

Embodiment I

Figure 2:
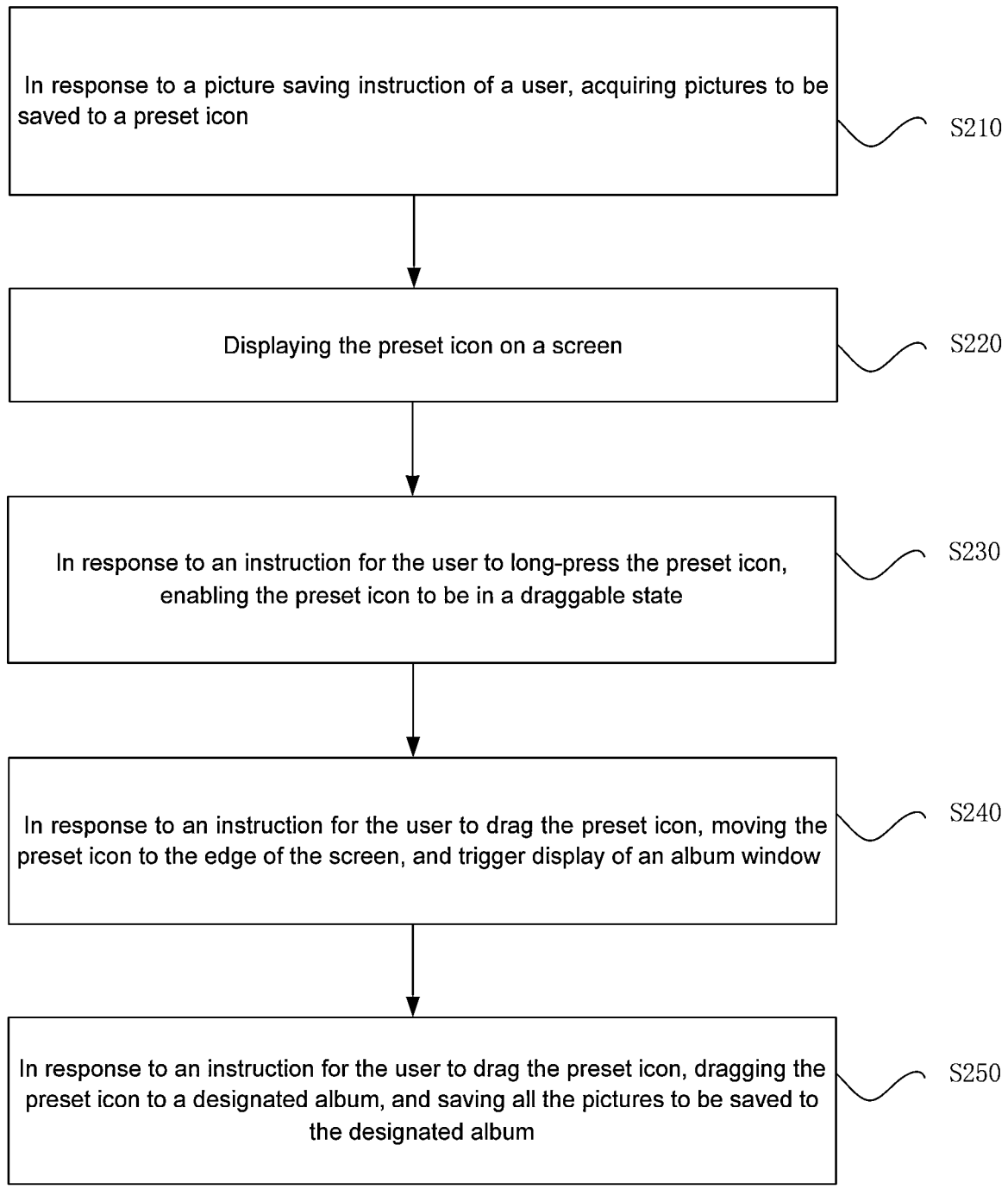
FIG. 2 is a flowchart of a picture saving method according to a specific implementation mode in Embodiment I of the present disclosure.

As shown in FIG. 2, an implementation mode of the present disclosure provides a picture saving method, and the picture saving method includes the following steps S210 to S250.

In the step S210, in response to a picture saving instruction of a user, pictures to be saved are acquired to a preset icon.

Figure 4:
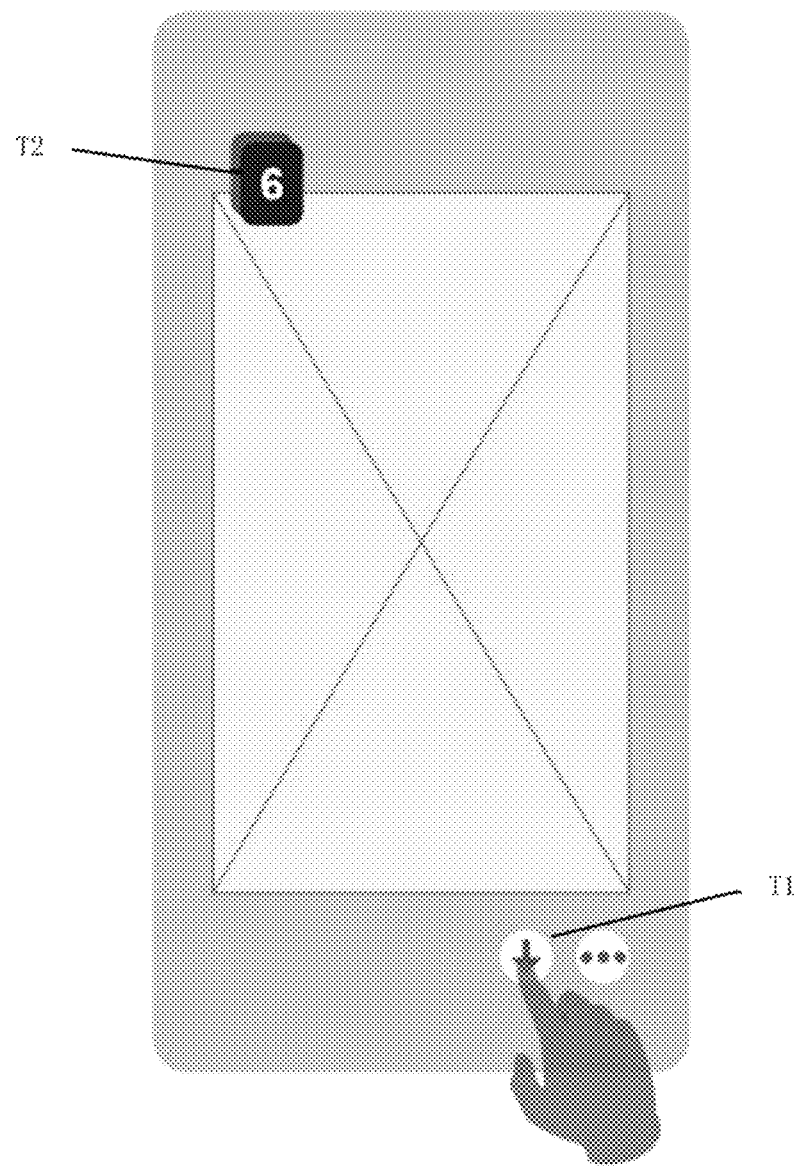
FIG. 4 is a schematic diagram of a preset icon displayed in response to an instruction for a user to save a picture in the present disclosure.

As shown in FIG. 4, while the picture is browsed in mobile phone application software, a picture saving button T1 is clicked, and in response to the picture saving instruction of the user, information of the picture to be saved is saved to one preset icon T2 for subsequent processing.

In the step S220, the preset icon is displayed on a screen.

As shown in FIG. 4, after the user clicks the picture saving button T1, the preset icon T2 is displayed on the mobile phone screen, and the preset icon T2 may be located at any positions on the screen for subsequent operations.

Specifically, the number of the pictures to be saved is displayed on the preset icon T2, so that the user may know how many pictures to be saved are there at present, and it is convenient for the subsequent operations.

In the step S230, in response to an instruction for the user to long-press the preset icon, the preset icon is enabled to be in a draggable state.

Figure 7:
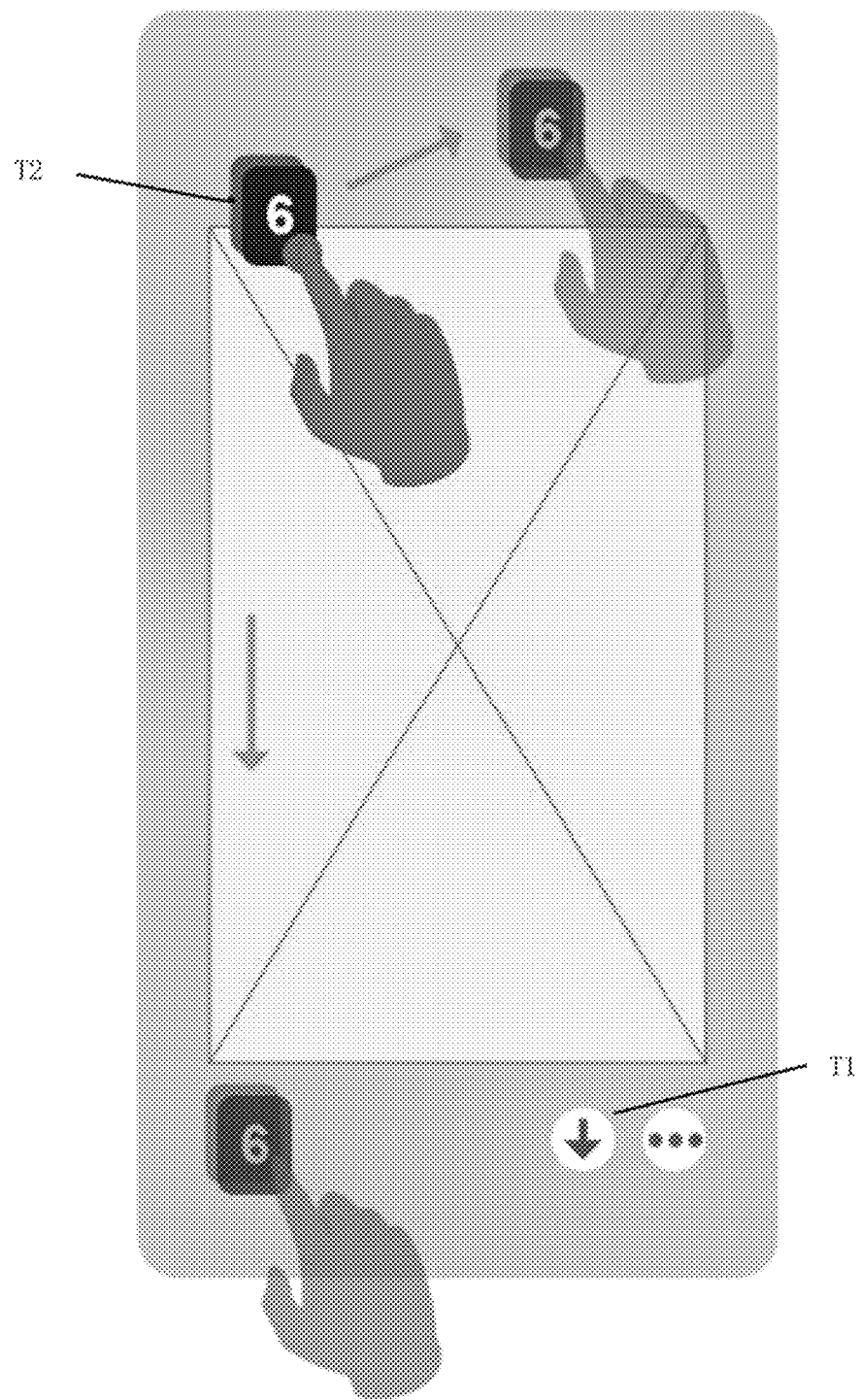
FIG. 7 is a schematic diagram in response to an instruction for the user to drag the preset icon in the present disclosure.

As shown in FIG. 7, the user long-presses the preset icon T2 on the mobile phone screen, and in response to the instruction for the user to long-press the preset icon T2, the preset icon T2 is enabled to be in the draggable state for the subsequent operations.

Specifically, in response to the instruction for the user to long-press the preset icon T2, the preset icon T2 is enabled to be in the draggable state, and in response to an instruction for the user to drag the preset icon T2, the preset icon T2 is moved. Specifically, while the preset icon T2 is in the draggable state, the preset icon T2 is displayed as a jitter state.

For example, while application software is used by the user, the position of the preset icon T2 hinders the user to use the mobile phone. Therefore, the user moves the preset icon T2 and adjusts the position of the preset icon T2, so that it no longer hinders the user by the user.

In the step S240, in response to an instruction for the user to drag the preset icon, the preset icon is moved to the edge of the screen, and display of an album window is triggered.

Figure 5:
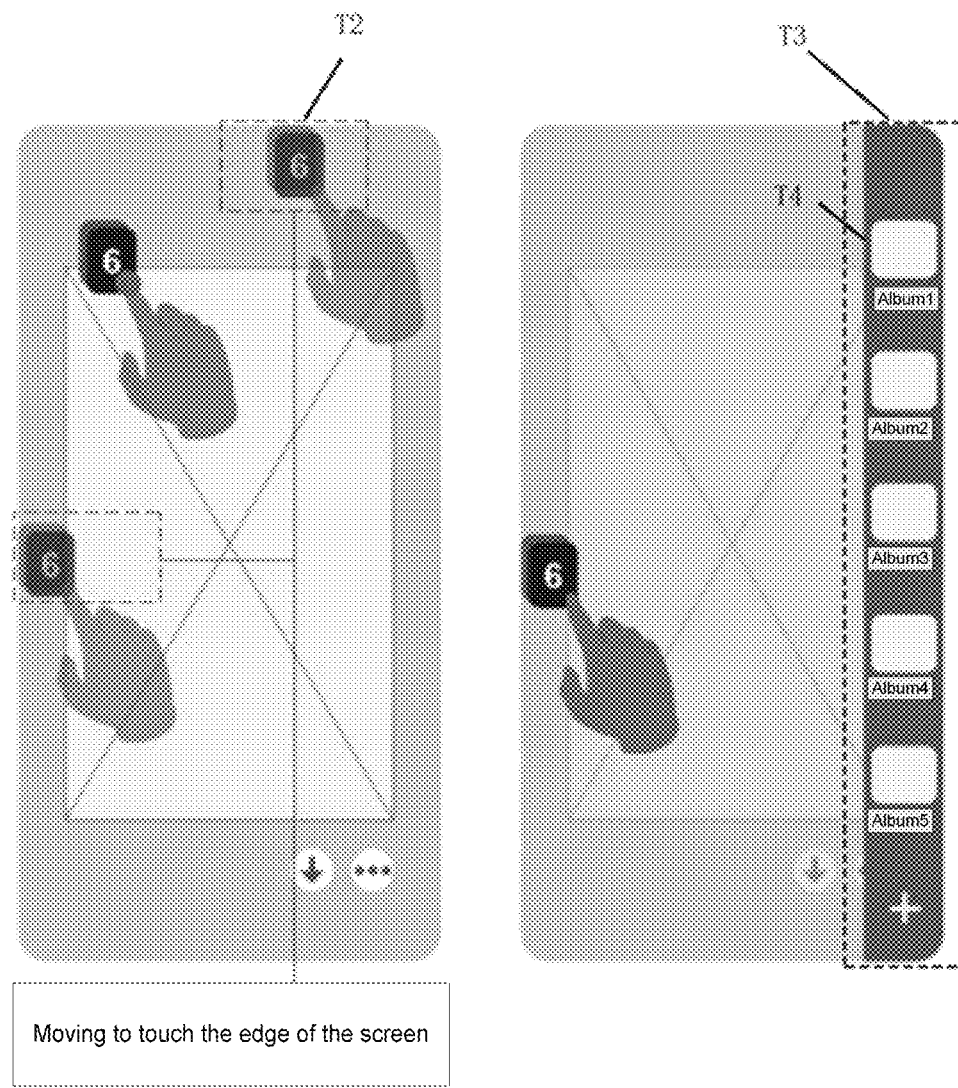
FIG. 5 is a schematic diagram of displaying an album window triggered in response to an instruction for the user to drag the preset icon to the edge of a screen in the present disclosure.

As shown in FIG. 5, in response to the instruction for the user to drag the preset icon T2 in the draggable state to the edge of the screen, the album window T3 is triggered to display on the screen. The album window T3 contains the designated album T4, and it is used to drag the preset icon to the designated album T4 in the future, thus an operation of saving the picture is completed. It should be noted that the above screen edge is not limited to specific positions, and the upper, lower, left, and right edges of the screen are all acceptable. The album window T3 and the middle layer of the picture may have masking, and the layers are distinguished, so the operation interface is simple and clean, and the reading burden of the user is reduced.

In the step S250, in response to an instruction for the user to drag the preset icon, the preset icon is dragged to the designated album, and all the pictures to be saved are saved to the designated album.

Figure 6:
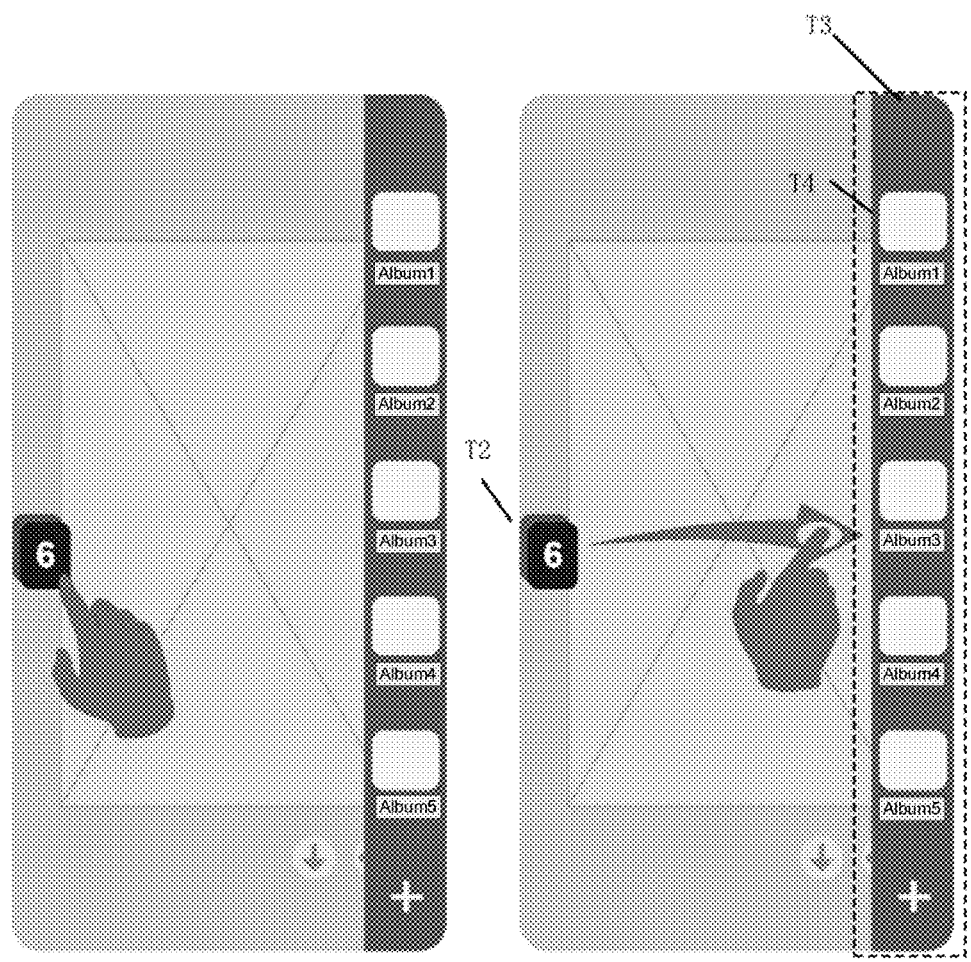
FIG. 6 is a schematic diagram in response to an instruction for the user to drag the preset icon to a designated album in the present disclosure.

As shown in FIG. 6, in response to the instruction for the user to drag the preset icon T2 in the draggable state to the designated album T4 in the album window T3, and all the pictures to be saved in the preset icon T2 are saved to the designated album T4.

The user may cache the information of the picture to be saved in the preset icon by clicking the saving button, and then drag the preset icon to the designated so that all the pictures cached in the preset icon may be saved to the designated album by the user, the situation that the pictures may only be saved separately and may not be saved in batches is improved, so the operation of saving the pictures is easier for the user.

Embodiment II

Figure 3:
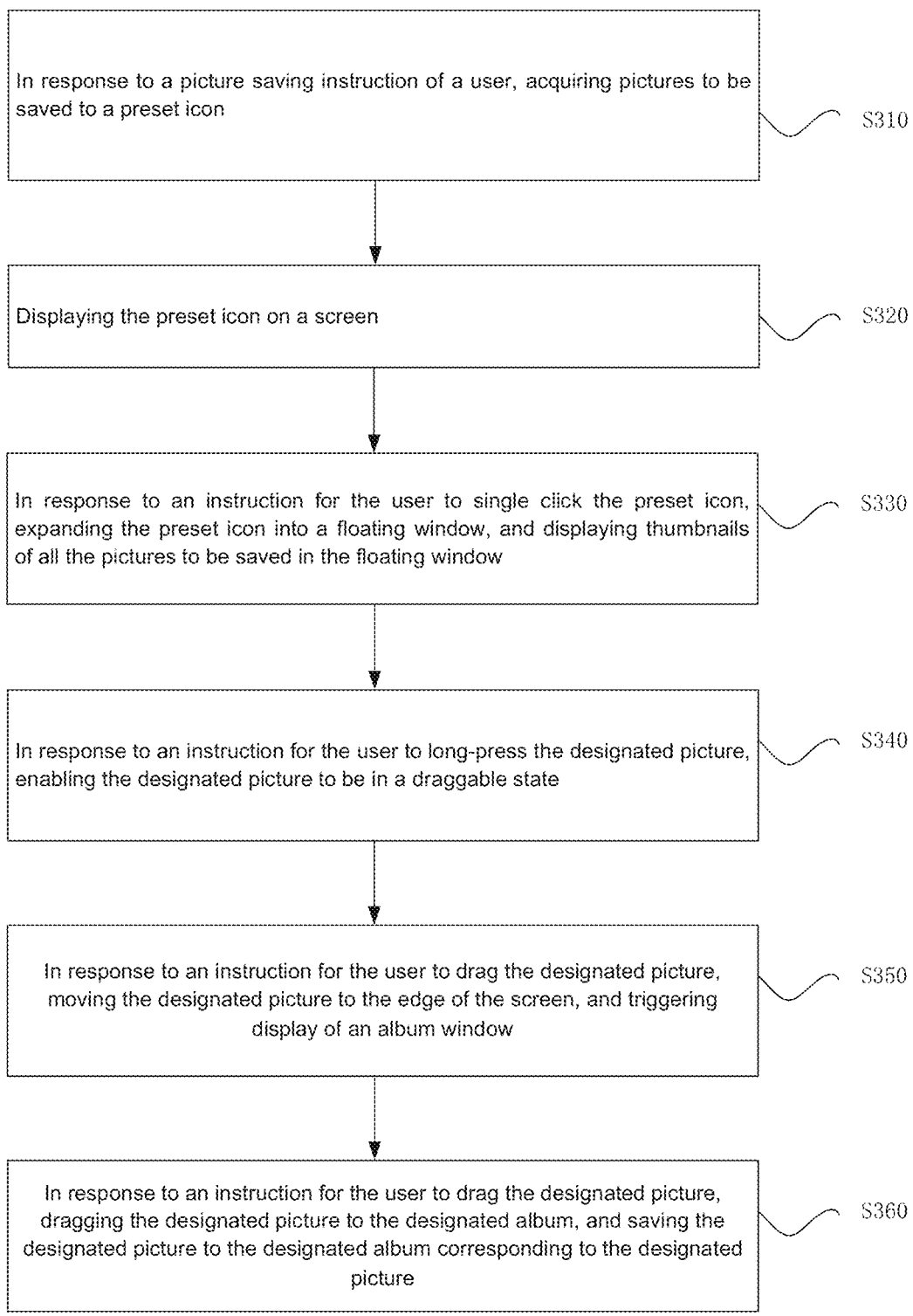
FIG. 3 is a flowchart of a picture saving method according to a specific implementation mode in Embodiment II of the present disclosure.

As shown in FIG. 3, an implementation mode of the present disclosure provides a picture saving method, and the picture saving method includes the following steps S310 to S360.

In the step S310, in response to a picture saving instruction of a user, pictures to be saved are acquired to a preset icon.

As shown in FIG. 4, while the picture is browsed in mobile phone application software, a picture saving button T1 is clicked, and in response to the picture saving instruction of the user, information of the picture to be saved is saved to a preset icon T2 for subsequent processing.

In the step S320, the preset icon is displayed on a screen.

As shown in FIG. 4, after the user clicks the picture saving button T1, the preset icon T2 is displayed on the mobile phone screen, and the preset icon T2 may be located at any positions on the screen for subsequent operations.

In the step S330, in response to an instruction for the user to single click the preset icon, the preset icon is expanded into a floating window, and thumbnails of all the pictures to be saved are displayed in the floating window.

Figure 8:
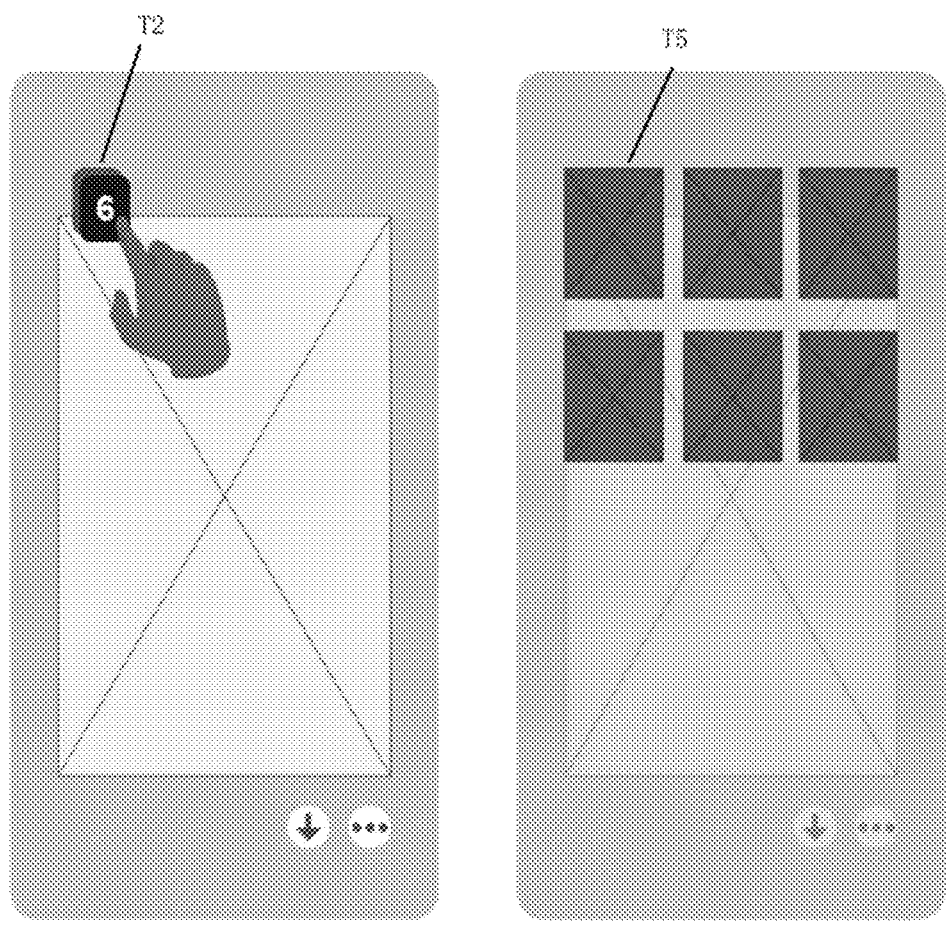
FIG. 8 is a schematic diagram of thumbnails of pictures to be saved displayed in response to an instruction for the user to single click the preset icon in the present disclosure.

As shown in FIG. 8, in response to the instruction for the user to single click the preset icon T2 on the screen, the preset icon T2 is expanded into the floating window, and the thumbnails T5 of all the pictures to be saved are displayed in the floating window. Therefore, the user may simultaneously view the thumbnails T5 of all the pictures to be saved, so that the user may select and operate on a certain designated picture in the future. The floating window may be intelligently located at the top left of the picture according to the picture height, the picture is avoided from being blocked, and the floating window automatically disappears without a saving operation for a certain period of time. The floating window may display the number of the pictures saved within a certain period of time, the floating window is clicked, and black masking may appear above the picture to distinguish layers; and the floating window is expanded to present a thumbnail of the saved picture. The floating window may also be long-pressed to customize and adjust its position after vibration.

Specifically, in response to an instruction for the user to edit the pictures, the pictures to be saved are edited.

For example, a designated picture is selected in the floating window, and in response to the instruction for the user to edit the designated picture T5, the designated picture T5 to be saved is edited. After being edited, the edited picture may be saved to the designated album.

In the step S340, in response to an instruction for the user to long-press the designated picture, the designated picture is enabled to be in a draggable state.

Figure 9:
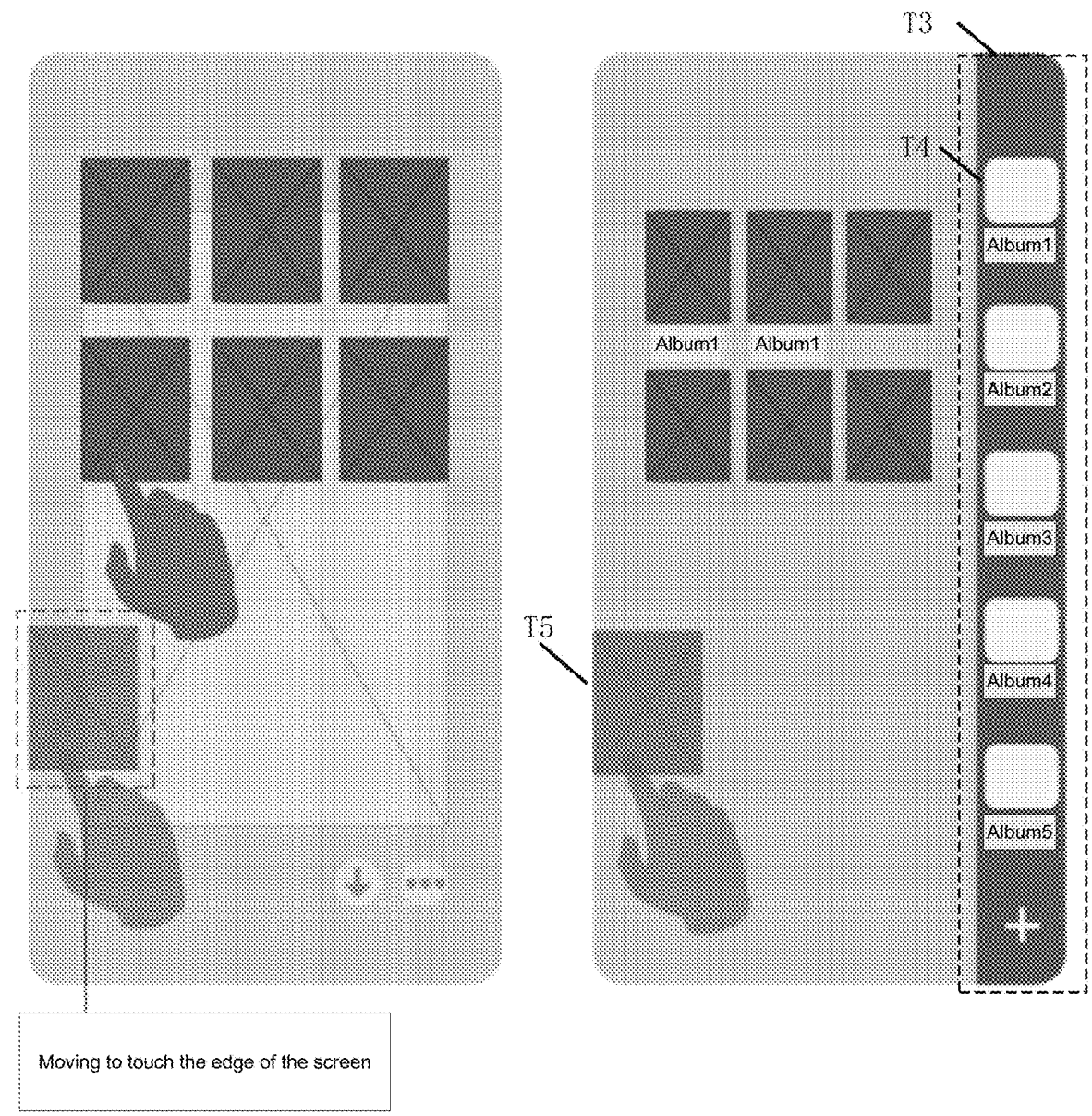
FIG. 9 is a schematic diagram of displaying the album window triggered in response to an instruction for the user to drag the designated picture to the edge of the screen in the present disclosure.

As shown in FIG. 9, the user long-presses the designated picture T5 on the mobile phone screen, and in response to the instruction for the user to long-press the designated picture T5, the designated picture T5 is enabled to be in the draggable state, so that it is dragged to the designated album T4 subsequently.

In the step S350, in response to an instruction for the user to drag the designated picture, the designated picture is moved to the edge of the screen, and display of an album window is triggered.

As shown in FIG. 9, in response to the instruction for the user to drag the designated picture T5 in the draggable state to the edge of the screen, the album window T3 is triggered to display on the screen. The album window T3 contains the designated album T4, and it is used to drag the designated picture to the designated album T4 in the future, thus an operation of saving the picture is completed. It should be noted that the above screen edge is not limited to specific positions, and the upper, lower, left, and right edges of the screen are all acceptable. The album window T3 and the middle layer of the picture may have masking, and the layers are distinguished, so the operation interface is simple and clean, and the reading burden of the user is reduced.

In the step S360, in response to an instruction for the user to drag the designated picture, the designated picture is dragged to the designated album, and the designated picture is saved to the designated album corresponding to the designated picture.

Figure 10:
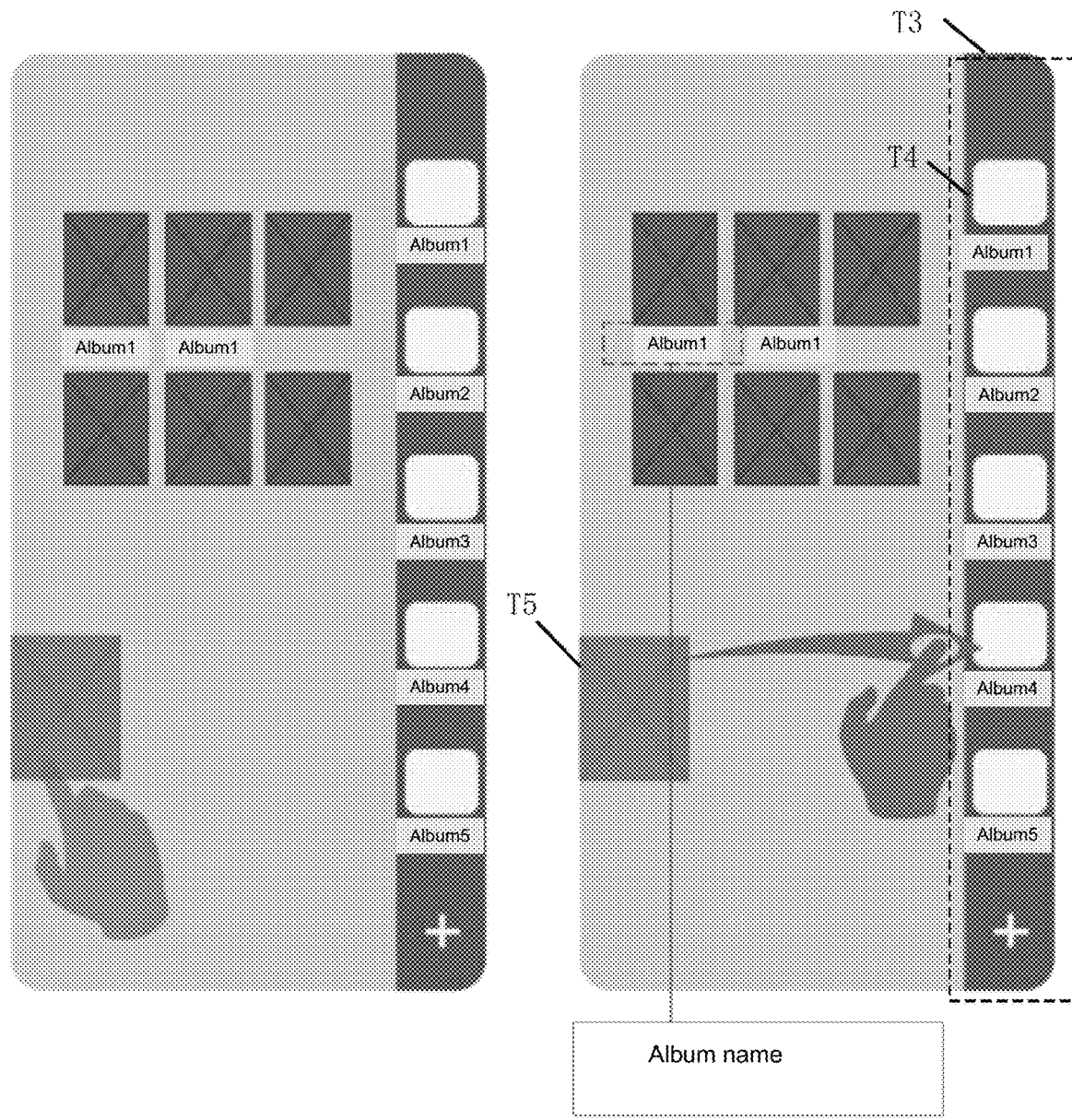
FIG. 10 is a schematic diagram in response to an instruction for the user to drag the designated picture to the designated album in the present disclosure.

As shown in FIG. 10, in response to the instruction for the user to drag the designated picture T5, the designated picture T5 is dragged to the designated album T4, and the designated picture T5 is saved to the designated album T4 corresponding to the designated picture T5, thereby the operation of saving a single picture is completed.

The user may single click the preset icon to display the floating window, the thumbnail of the picture to be saved is displayed in the floating window, then, the designated picture is dragged to the designated album so that the user may select and save the designated picture to the designated album, the situation that the picture may only be saved to a default album by default is improved, so the operation of saving the pictures is easier for the user.

Embodiment III

An implementation mode of the present disclosure provides an electronic device, the electronic device may be a mobile phone, a tablet computer or the like, including a memory and a processor. The memory is set to store one or more computer instructions, herein the picture saving method in the above embodiments is achieved while the one or more computer instructions are executed by the processor.

Herein, the processor is set to execute all or part of the steps in the picture saving method according to Embodiment I or Embodiment II. The memory is set to store various types of data, such as picture information parameters.

The processor may be an Application specific Integrated Circuit (ASIC for short), a Digital Signal Processor (DSP for short), a Digital Signal Processing Device (DSPD for short), a Programmable Logic Device (PLD for short), a Field Programmable Gate Array (FPGA for short), a controller, a microcontroller, a microprocessor or other electronic elements, and it is set to execute the picture saving method in Embodiment I above.

The memory may be achieved by any types of volatile or non-volatile storage devices, or a combination of them, such as a Static Random Access Memory (SRAM for short), an Electrically Erasable Programmable Read-Only Memory (EEPROM for short), an Erasable Programmable Read-Only Memory (EPROM for short), a Programmable Read-Only Memory (PROM for short), a Read-Only Memory (ROM for short), a magnetic memory, a flash memory, a magnetic disk or an optical disk.

Each functional unit in each embodiment of the present disclosure may be integrated in one processing unit, or each unit may exist physically independently, or two or more units may be integrated in one unit. If the function is implemented in the form of a software functional unit and sold or used as an independent product, it may be stored in a computer-readable storage medium. Based on this understanding, a technical scheme of the present disclosure, in essence or a part that contributes to related technologies or a part of this technical scheme, may be reflected in the form of a software product, and this computer software product is stored in a storage medium, including a plurality of instructions used to enable a computer device (it may be a personal computer, a server, a network device or the like) to perform all or part of the steps of the method in each embodiment of the present disclosure. The aforementioned storage medium includes: a USB flash disk, a mobile hard disk drive, a Read-Only Memory (ROM), a Random Access Memory (RAM), a magnetic disk or optical disk, and other media that may store program verification codes.

It should be noted that terms used here are only for the purpose of describing the specific implementation modes, and are not intended to limit the exemplary implementation modes according to the present disclosure. While terms "having" and/or "including" are used in this description, it is indicated that there are features, steps, operations, devices, components, and/or combinations thereof.

The above are only the specific implementation modes of the present disclosure, but the scope of protection of the present disclosure is not limited thereto. Within the scope of the technology disclosed by the present disclosure, those of ordinary skill in the art may easily think of changes or replacements that shall fall within the scope of protection of the present disclosure. Therefore, the scope of protection of the present disclosure should be based on the scope of protection of the claim. The above are only preferred embodiments of the present disclosure, and are not intended to limit the present disclosure. Any modifications, equivalent replacements and the like made within the spirit and principles of the present disclosure should be included within the scope of protection of the present disclosure.

It should be noted that terms "first", "second" and the like in the description, claim, and drawings of the present disclosure are used to distinguish similar objects, rather than to describe a specific sequence or precedence order. It should be understood that the terms used in this way may be interchanged in appropriate cases, so that the implementation modes of the present disclosure described herein may be implemented, for example, in a sequence other than those illustrated or described here.

It should be understood that the exemplary implementation modes in this description may be implemented in the different forms, and should not be construed to be limited to the implementation modes described here. These implementation modes are provided in order to make the present disclosure thorough and complete, and to fully convey the ideas of these exemplary implementation modes to those of ordinary skill in the art, and it should not be understood as limitation to the present disclosure.

What is claimed is:

1. A picture saving method, comprising:
    an acquisition step, in response to a picture saving instruction of a user, acquiring pictures to be saved to a preset icon;
    a first display step, displaying the preset icon on a screen;
    a second display step, in response to a first instruction of the user operating the preset icon, triggering display of an album window, wherein the first instruction is that the preset icon is moved to the edge of the screen; and
    a saving step, in response to a second instruction of the user operating the preset icon, saving at least one of the pictures to be saved to a designated album displayed in the album window,
    wherein the second instruction comprises an instruction for the user to long-press the preset icon and an instruction for the user to drag the preset icon to the designated album,
    the saving step comprises:
    in response to the instruction for the user to long-press the preset icon, enabling the preset icon to be in a draggable state; and
    in response to the instruction for the user to drag the preset icon to the designated album, saving all the pictures to be saved to the designated album;

wherein the second instruction comprises an instruction for the user to single click the preset icon, an instruction for the user to long-press a designated picture and an instruction for the user to drag the designated picture, the saving step comprises:

in response to the instruction for the user to single click the preset icon, expanding the preset icon into a floating window, and displaying all the pictures to be saved in the floating window;

in response to the instruction for the user to long-press the designated picture, enabling the designated picture to be in a draggable state; and in response to the instruction for the user to drag the designated picture, saving the designated picture to the designated album corresponding to the designated picture;

wherein the first display step further comprises the following steps: displaying the number of the pictures to be saved on the preset icon; and the floating window automatically disappears without a saving operation for a certain period of time;

wherein while the preset icon is in the draggable state, the preset icon is displayed as a jitter state.

2. The picture saving method according to claim 1, wherein thumbnails of all the pictures to be saved are displayed in the floating window.

3. The picture saving method according to claim 2, wherein the saving step further comprises:

in response to an instruction for the user to edit a picture, editing the pictures to be saved.

4. The picture saving method according to claim 1, further comprising:

a moving step, in response to an instruction for the user to long-press the preset icon, enabling the preset icon to be in a draggable state, and in response to an instruction for the user to drag the preset icon, moving the preset icon.

5. An electronic device, comprising a memory and a processor, wherein the memory is configured to store one or more computer instructions, wherein a picture saving method is achieved while the one or more computer instructions are executed by the processor, wherein the method comprises:

an acquisition step, in response to a picture saving instruction of a user, acquiring pictures to be saved to a preset icon;

a first display step, displaying the preset icon on a screen;

a second display step, in response to a first instruction of the user operating the preset icon, triggering display of an album window, wherein the first instruction is that the preset icon is moved to the edge of the screen; and a saving step, in response to a second instruction of the user operating the preset icon, saving at least one of the pictures to be saved to a designated album displayed in the album window, wherein the second instruction comprises an instruction for the user to long-press the preset icon and an instruction for the user to drag the preset icon to the designated album, the saving step comprises:

in response to the instruction for the user to long-press the preset icon, enabling the preset icon to be in a draggable state; and in response to the instruction for the user to drag the preset icon to the designated album, saving all the pictures to be saved to the designated album;

wherein the second instruction comprises an instruction for the user to single click the preset icon, an instruction for the user to long-press a designated picture and an instruction for the user to drag the designated picture, the saving step comprises:

in response to the instruction for the user to single click the preset icon, expanding the preset icon into a floating window, and displaying all the pictures to be saved in the floating window;

in response to the instruction for the user to long-press the designated picture, enabling the designated picture to be in a draggable state; and in response to the instruction for the user to drag the designated picture, saving the designated picture to the designated album corresponding to the designated picture;

wherein the first display step further comprises the following steps: displaying the number of the pictures to be saved on the preset icon; and the floating window automatically disappears without a saving operation for a certain period of time;

wherein while the preset icon is in the draggable state, the preset icon is displayed as a jitter state.

6. The electronic device according to claim 5, wherein thumbnails of all the pictures to be saved are displayed in the floating window.

7. The electronic device according to claim 6, wherein the saving step further comprises:

in response to an instruction for the user to edit a picture, editing the pictures to be saved.

8. The electronic device according to claim 5, further comprising:

a moving step, in response to an instruction for the user to long-press the preset icon, enabling the preset icon to be in a draggable state, and in response to an instruction for the user to drag the preset icon, moving the preset icon.

9. A computer-readable storage medium, wherein a program is stored, and a picture saving method is achieved while the program is executed by a computer, wherein the method comprises:

an acquisition step, in response to a picture saving instruction of a user, acquiring pictures to be saved to a preset icon;

a first display step, displaying the preset icon on a screen;

a second display step, in response to a first instruction of the user operating the preset icon, triggering display of an album window, wherein the first instruction is that the preset icon is moved to the edge of the screen; and a saving step, in response to a second instruction of the user operating the preset icon, saving at least one of the pictures to be saved to a designated album displayed in the album window, wherein the computer-readable storage medium is a non-volatile storage medium, and comprises: a USB disk, a removable hard disk, a read-only memory, a random access memory, a magnetic disk, or an optical disk;

wherein the second instruction comprises an instruction for the user to long-press the preset icon and an instruction for the user to drag the preset icon to the designated album, the saving step comprises:

in response to the instruction for the user to long-press the preset icon, enabling the preset icon to be in a draggable state; and in response to the instruction for the user to drag the preset icon to the designated album, saving all the pictures to be saved to the designated album;

wherein the second instruction comprises an instruction for the user to single click the preset icon, an instruction for the user to long-press a designated picture and an instruction for the user to drag the designated picture, the saving step comprises:

in response to the instruction for the user to single click the preset icon, expanding the preset icon into a floating window, and displaying all the pictures to be saved in the floating window;

in response to the instruction for the user to long-press the designated picture, enabling the designated picture to be in a draggable state; and in response to the instruction for the user to drag the designated picture, saving the designated picture to the designated album corresponding to the designated picture;

wherein the first display step further comprises the following steps: displaying the number of the pictures to be saved on the preset icon; and the floating window automatically disappears without a saving operation for a certain period of time;

wherein while the preset icon is in the draggable state, the preset icon is displayed as a jitter state.

10. The computer-readable storage medium according to claim 9, wherein thumbnails of all the pictures to be saved are displayed in the floating window.

\* \* \* \* \*